(12) United States Patent
Phillips et al.

(10) Patent No.: US 9,179,596 B2
(45) Date of Patent: Nov. 10, 2015

(54) END OF CUT SPEED CONTROL SYSTEM

(71) Applicant: Deere & Company, Moline, IL (US)

(72) Inventors: David L. Phillips, Willow Springs, NC (US); Richard F. Percy, Cumming, IA (US); David A. Straka, Willow Spring, NC (US); Clint W. Lampley, High Point, NC (US); Paul R. Heide, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 279 days.

(21) Appl. No.: 13/891,344

(22) Filed: May 10, 2013

(65) Prior Publication Data

US 2014/0331630 A1    Nov. 13, 2014

(51) Int. Cl.
*G06F 7/70* (2006.01)
*G06F 19/00* (2011.01)
*G06G 7/00* (2006.01)
*G06G 7/76* (2006.01)
*A01D 34/00* (2006.01)
*B60T 8/1755* (2006.01)

(52) U.S. Cl.
CPC ........... *A01D 34/006* (2013.01); *B60T 8/1755* (2013.01)

(58) Field of Classification Search
CPC ........ B60K 17/30; B60K 26/00; B60K 28/16; A01D 34/008; A01D 34/47; B60T 8/175
USPC ............... 701/42, 70, 71, 50, 48; 180/165; 56/10.8, 10.2 H
See application file for complete search history.

(56) References Cited

U.S. PATENT DOCUMENTS

| | | | |
|---|---|---|---|
| 4,572,310 A | 2/1986 | Peter | |
| 4,779,202 A | 10/1988 | Leiber | |
| 5,335,176 A | 8/1994 | Nakamura | |
| 5,497,604 A * | 3/1996 | Lonn | 56/10.2 H |
| 6,092,617 A | 7/2000 | White, III et al. | |
| 6,230,089 B1 * | 5/2001 | Lonn et al. | 701/48 |
| 6,892,517 B2 * | 5/2005 | Adams et al. | 56/10.2 R |
| 7,111,443 B2 | 9/2006 | Anderson et al. | |
| 7,331,167 B1 * | 2/2008 | Drake et al. | 56/10.2 R |
| 7,418,328 B2 | 8/2008 | Romig | |
| 7,478,689 B1 | 1/2009 | Sugden et al. | |
| 7,735,592 B2 * | 6/2010 | Bellot et al. | 180/165 |
| 8,109,069 B2 * | 2/2012 | Moe et al. | 56/15.8 |
| 8,543,295 B2 * | 9/2013 | Bryant et al. | 701/42 |
| 2004/0055266 A1 * | 3/2004 | Reimers et al. | 56/7 |
| 2005/0257508 A1 * | 11/2005 | Modzik et al. | 56/7 |
| 2009/0192691 A1 * | 7/2009 | O'Connor et al. | 701/90 |
| 2009/0235627 A1 * | 9/2009 | Silbernagel et al. | 56/10.2 G |
| 2013/0047565 A1 * | 2/2013 | Shida et al. | 56/10.2 H |

* cited by examiner

*Primary Examiner* — Árpád Fábián-Kovács

(57) ABSTRACT

An end of cut speed control system includes a vehicle controller that commands a traction drive system to a reduced ground speed based on the setting of a control to a preset end of cut mode ground speed as a percentage of the mow mode ground speed. The vehicle controller changes the speed from the mow mode to the end of cut mode when a proximity sensor indicates the cutting units are raised to a cross cut position.

7 Claims, 2 Drawing Sheets

END OF CUT SPEED CONTROL SYSTEM

FIELD OF THE INVENTION

This invention relates to mowers for golf course fairways and greens, and more specifically to an end of cut speed control system.

BACKGROUND OF THE INVENTION

Fairway mowers and greens mowers are self-propelled riding mowers having multiple cutting units providing a high quality cut, and may be capable of mowing successfully at ground speeds as high as 7 to 10 miles per hour. After each cross cut pass of a fairway or green, the operator may raise the cutting units and turn the mower around 180 degrees before making the next pass. This is referred to as the end of cut. When a fairway or greens mower travels at these high speeds at the end of cut, there may be a risk of damage to the turf as the wheels and tires of the mower make sharp turns on soft ground. To reduce or prevent turf damage, golf course management may adjust mow speed controls to maximum ground speeds of only 3 to 6 miles per hour. This results in a significant reduction of productivity.

There is a need for a fairway or greens mower that can mow at high ground speeds without damaging turf at the end of cut. There is a need to increase productivity when mowing golf course fairways or greens.

SUMMARY OF THE INVENTION

An end of cut speed control system includes a sensor that detects and provides signals to a vehicle controller indicating if a plurality of cutting units on a fairway or greens mower are in a lowered mow position or a raised cross cut position. The vehicle controller reduces the traction drive speed of the mower if the cutting units are in the raised cross cut position. The amount of traction drive speed reduction may be based on an end of cut speed that may be preset on a display module on the mower.

DESCRIPTION OF THE PREFERRED EMBODIMENT

Figure 1:
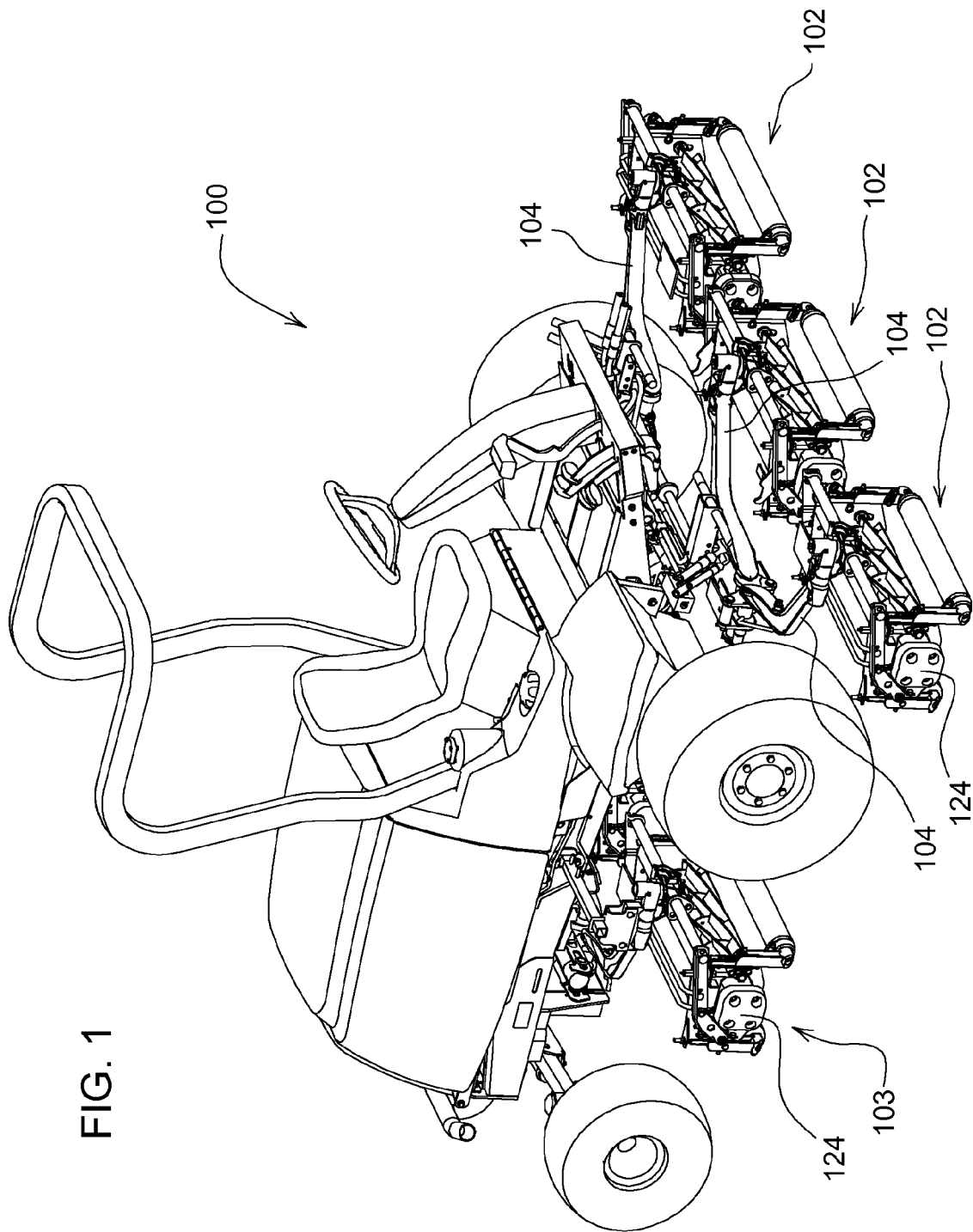
FIG. 1 is a drawing of a fairway mower having an end of cut speed control system according to one embodiment of the invention.

In an embodiment shown in FIG. 1, mower 100 includes an end of cut speed control system that reduces the mower's ground speed at the end of cut across a fairway or green. The end of cut speed control system is shown on a self-propelled fairway mower, and also may be used on self-propelled riding greens mowers or other self-propelled riding mowers that have multiple cutting units providing a high quality cut. The cutting units preferably include a first or front row of cutting units 102 connected to lift arms 104, and a second or rear row of cutting units 103 also connected to lift arms. The cutting units are preferably cutting reels, but also may be rotary cutting units.

Figure 2:
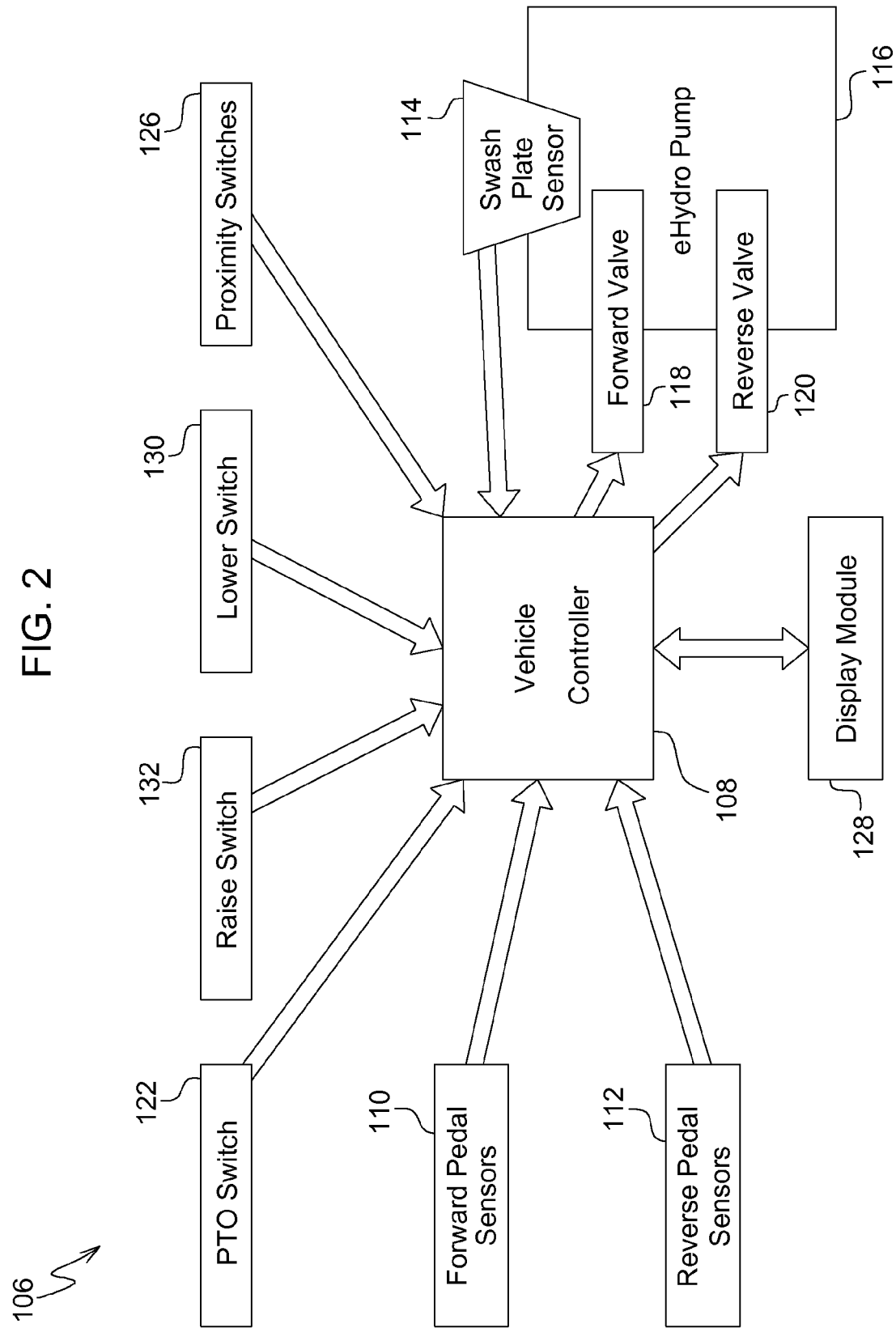
FIG. 2 is a flow diagram of an end of cut speed control system according to one embodiment of the invention.

Now referring to FIG. 2, end of cut speed control system 106 may include vehicle controller 108 that controls the ground speed of a fairway or greens mower based on input signals from one or more forward pedal sensors 110, one or more reverse pedal sensors 112, and swash plate sensor 114 of electronically controlled hydrostatic or eHydro pump 116. The input signals from the forward and reverse pedal sensors may include PWM voltages indicating desired ground speed based on pedal position at a known and/or fixed engine speed. The input signal from the swash plate sensor may be a DC voltage indicating swash plate angle or position for a ground speed at the same known and/or fixed engine speed. Based on these inputs, the vehicle controller may determine the amount of DC current to forward and reverse pump valves 118, 120 to make any change to swash plate position. The DC current output may be based on the amount of error between ground speed demanded by the pedals and the swash plate position.

In one embodiment, a fairway or greens mower with the end of cut speed control system may have several modes of operation based on the position of PTO switch 122 that turns on hydraulic or electric cutting unit motors 124, and one or more proximity switches 126 that sense if the cutting units are on the ground or raised to a cross cut position. These switches may provide DC voltage inputs to vehicle controller 108. Although proximity switches are preferred, other types of sensors may be used to detect if the cutting units are on the ground or raised to a cross cut position. The operating modes may include a transport mode if the PTO switch is off, a mow mode if the PTO switch is on and the proximity switches detect the cutting units are on the ground in the mow position, and an end of cut mode if the PTO switch is on and the proximity switches detect the cutting units are partially raised off the ground at the cross cut position. (In the transport position, the cutting units may be raised completely, including raising the wing cutting units to hang vertically so the mower may have a narrower transport width.)

In one embodiment, the end of cut speed control system may include display module 128 connected by a CAN bus to the vehicle controller. The display module may have several controls that an operator may use to set a maximum transport mode ground speed, a maximum mow mode ground speed, and an end of cut mode ground speed that may be a percentage of the mow mode ground speed. The display module and/or vehicle controller preferably may limit access to the controls and/or block or restrict adjustment of the settings while the mower is moving.

In one embodiment, the end of cut speed control system may include lower switch 130 that provides DC voltage input to the vehicle controller, causing the cutting units to be lowered to the ground. The mower may cut grass in the mow mode only if lower switch 130 is actuated, PTO switch 122 is on, and proximity switches 126 sense the cutting units are below a predetermined height (essentially on the ground in a mow position).

In one embodiment, the end of cut speed control system may include raise switch 132 that provides DC voltage input to the vehicle controller. The mower may change from the mow mode to the end of cut mode when the operator actuates the raise switch. The raise switch causes the cutting units to raise to a predetermined height above the ground, and preferably less than about 10 inches off the ground, to a cross cut position. The raise switch may raise the cutting units using hydraulic lift valves or electric actuators, which may be electronically timed to raise the front cutting units before the rear cutting units. Additionally, actuating the raise switch may cause the ground speed of the mower to be reduced. The vehicle controller may provide current to the pump valves based on the equation: reduced speed=(current ground speed based on pedal position)×(end of cut speed percentage selected on display module). In the end of cut mode, the operator may continue to hold his foot down on the forward pedal, even when turning the mower around at the end of cut across a fairway or green.

In one embodiment, the end of cut speed control system may change from the end of cut mode to the mow mode when the operator actuates lower switch 130, causing the hydraulic lift valves or electric actuators to lower the cutting units back to the ground in the mow position. If PTO switch 122 remains on, and proximity switches 126 sense the cutting units are below a predetermined height, the vehicle control unit may command the pump valves to operate at a ground speed based on pedal position without any reduction by the end of cut speed percentage.

In an alternative embodiment, the end of cut speed control system may include an electric traction drive system having electric wheel motors instead of a hydrostatic drive system. For example, the vehicle control unit may provide commands to electric wheel motors to a reduced ground speed in the end of cut mode, as a percentage of the current ground speed. In another alternative, the vehicle control unit may reduce the maximum ground speed of the traction drive system in the end of cut mode.

In one embodiment, the end of cut speed control system may include proximity switches that detect flags 134 on each lift arm of a front cutting unit, or another characteristic or feature of a lift arm or cutting unit, to determine if the cutting units are on the ground or not.

In one embodiment, the vehicle control unit may ramp up or down the ground speed between the mow mode and the end of cut mode. The rate of change may use an algorithm designed to ramp to the reduced ground speed, or back up to the unreduced speed, within less than about 1 second.

In one embodiment, the vehicle controller may be connected to the sensors and switches by a system bus or CAN bus.

In one embodiment, a fairway or greens mower with the end of cut speed control system may operate in the mow mode at ground speeds as high as 7 to 10 miles per hour, with reduced or minimal turf damage when reaching the end of cut and turning. The clip frequency of the reel cutting units may be set for the higher ground speed.

Having described the preferred embodiment, it will become apparent that various modifications can be made without departing from the scope of the invention as defined in the accompanying claims.

The invention claimed is:

1. An end of cut speed control system, comprising:
    a forward foot pedal sensor providing signals to a vehicle controller that commands a traction drive system of a mower;
    a PTO switch providing signals to the vehicle controller and turning on cutting motors on a plurality of cutting units;
    a proximity switch providing signals to the vehicle controller indicating if the plurality of cutting units are on the ground in a mow position or are raised to a cross cut position;
    a display module providing signals to the vehicle controller based on a setting of a control to a maximum mow mode ground speed and a setting of a control to an end of cut mode ground speed as a percentage of the mow mode ground speed;
    the vehicle controller commanding the traction drive system to a reduced ground speed determined as the product of a current ground speed based on the signals from the forward foot pedal sensor and the end of cut speed percentage, if the PTO switch is on and the proximity switch indicates the cutting units are raised to the cross cut position.

2. The end of cut speed control system of claim 1 wherein the cutting units include a first row of cutting units and a second row of cutting units, and further comprising a raise switch and a lower switch providing signals to the vehicle controller and raising or lowering the first row of cutting units before the second row of cutting units.

3. The end of cut speed control system of claim 1 wherein the vehicle controller commands the traction drive system to the mow mode ground speed based on pedal sensor position if the PTO switch is on and the proximity switch indicates the cutting units are on the ground in the mow position.

4. The end of cut speed control system of claim 1 wherein the cutting motors are electric motors on cutting reels.

5. An end of cut speed control system, comprising:
    a vehicle controller on a mower receiving input signals from a forward pedal sensor, a PTO switch, a raise switch, a lower switch, a proximity switch, and a display module, and providing output signals to command a traction drive system to operate the mower at a ground speed;
    the vehicle controller changing the output signals to the traction drive system to reduce the ground speed relative to the signals from the forward pedal sensor, if the vehicle controller receives input signals indicating the PTO switch is on and the proximity switch indicates a plurality of cutting units are raised to a cross cut position.

6. The end of cut speed control system of claim 5 wherein the vehicle controller reduces the ground speed by multiplying the ground speed based on signals from the forward pedal sensor and an end of cut mode ground speed.

7. The end of cut speed control system of claim 5 wherein the display module allows a preset maximum mow mode ground speed.

\* \* \* \* \*